United States Patent
Kirino et al.

[11] Patent Number: 5,962,153
[45] Date of Patent: Oct. 5, 1999

[54] SOFT MAGNETIC THIN FILM, AND MAGNETIC HEAD AND MAGNETIC RECORDING APPARATUS USING THE FILM

[75] Inventors: Fumiyoshi Kirino, Tokyo; Nagatugu Koiso, Tama, both of Japan

[73] Assignee: Hitachi, Ltd., Tokyo, Japan

[21] Appl. No.: 08/831,537

[22] Filed: Apr. 8, 1997

[30] Foreign Application Priority Data

Apr. 12, 1996 [JP] Japan ................................. 8-091105
Sep. 20, 1996 [JP] Japan ................................. 8-249592

[51] Int. Cl.⁶ .................................................... G11B 5/66
[52] U.S. Cl. ................. 428/692; 428/694 R; 428/694 T; 428/900; 360/113; 360/128
[58] Field of Search .......................... 428/694 R, 694 T, 428/692, 900; 360/113, 128

[56] References Cited

U.S. PATENT DOCUMENTS

| | | | |
|---|---|---|---|
| 5,068,147 | 11/1991 | Hori | 428/336 |
| 5,466,539 | 11/1995 | Takayama | 428/611 |
| 5,549,978 | 8/1996 | Iwasaki | 428/692 |
| 5,573,863 | 11/1996 | Hayakawa et al. | 428/694 T |
| 5,663,006 | 9/1997 | Nakamura | 478/694 R |

FOREIGN PATENT DOCUMENTS 320444  1/1991  Japan.

*Primary Examiner*—Leszek Kiliman
*Attorney, Agent, or Firm*—Kenyon & Kenyon

[57] ABSTRACT

To obtain a soft magnetic thin film having improved soft magnetic characteristics, thermal stability and corrosion resistance, this invention uses a soft magnetic thin film comprising Fe as the principal component thereof and containing Ta and/or Hf and C and/or N, wherein the (110) plane of Fe is preferentially oriented, the size $d_1$ of the Fe crystal particle is not greater than 15 nm and the size $d_2$ of the Ta—C, Ta—N, Hf—C or Hf—N particle is not greater than 3 nm. The crystal particle size is controlled by causing first the Fe crystal particle to precipitate at the initial stage of the film formation and then causing the crystal particle of Ta—C, Ta—N, Hf—C or Hf—N to precipitate.

23 Claims, 5 Drawing Sheets

SOFT MAGNETIC THIN FILM, AND MAGNETIC HEAD AND MAGNETIC RECORDING APPARATUS USING THE FILM

BACKGROUND OF THE INVENTION

This invention relates to a microcrystal precipitation type Fe type soft magnetic thin film having a high saturation flux density. More particularly, it relates to a soft magnetic thin film having high performance and high reliability, and a magnetic head and a recording apparatus produced by using the soft magnetic thin film.

Needs for compact, and moreover, high density information storage apparatuses have been increasing with the recent progress of the high information society. To accomplish high density recording, a medium having a high coercive force so that very small recorded magnetic domains exist stably, and a high performance magnetic head capable of recording information to this medium are necessary. To record signals by magnetizing the medium having a high coercive force, a magnetic head material having a high saturation flux density and capable of generating a strong magnetic field is necessary. Fe—C type and Fe—N type materials are known at present as the materials having a high saturation flux density. These materials are thermally treated at a predetermined temperature so as to exhibit soft magnetic characteristics. The temperature of this thermal treatment is decided by a temperature necessary for exhibiting the soft magnetic characteristics (crystallization point). This temperature further depends on the materials employed and their composition. When a magnetic head is produced by using the materials, particularly when the head is a metal-in-gap (MIG) type head, annealing at a predetermined temperature is necessary because the head production process includes a glass bonding step. The bonding temperature in this case is determined by the material of fusing glass. The temperature is determined by the melting point of fusing glass and is ordinarily set to a temperature higher than the crystallization temperature. For, when the bonding temperature is high, the strength of glass becomes high and when the bonding temperature is low, on the contrary, the strength of glass becomes low. For this reason, the bonding temperature of glass used ordinarily is higher in most cases than the temperature at which the soft magnetic characteristics are exhibited. This means that the magnetic film must has thermal stability to withstand at least the melting point of glass used. Particularly because the soft magnetic characteristics depend on the size of the fine crystal particles that precipitate, the crystal particle size must be controlled in order to obtain a magnetic film having excellent soft magnetic characteristics.

Since these materials consist of Fe as the principal component, they react with oxygen in air or water and form hydroxides and oxides to thereby invite the fluctuation of the magnetic characteristics, particularly the coercive force and the saturation flux density. In consequence, performance of the magnetic head drops in some cases. To put the magnetic head using the materials into practical application, therefore, the fluctuation of the magnetic characteristics due to corrosion when the magnetic film is left standing in the environment of use must be restricted, and such a fluctuation must also be eliminated even after the magnetic head is passed through the glass bonding step.

To solve these problems, proposals have been made to add those elements which improve the corrosion resistance in addition to magnetic elements. Nonetheless, it has been difficult in the past to simultaneously satisfy the soft magnetic characteristics and the corrosion resistance. JP-A-03-20444 is one of the prior art references examining these technical points.

The prior art reference described above discloses a method which is effective for improving any one of the soft magnetic characteristics, thermal stability and corrosion resistance. However, the reference does not sufficiently disclose a method for improving simultaneously all these characteristics. The reference does not at all teach or suggest the method for simultaneously improving the characteristics for soft magnetic films having a saturation flux density of at least 1.5T.

SUMMARY OF THE INVENTION

In view of the problems of the prior art technologies described above, the present invention is directed to provide a soft magnetic thin film which has excellent soft magnetic characteristics and at the same time, high thermal stability and high reliability.

A soft magnetic thin film according to the present invention capable of accomplishing the object described above is a soft magnetic thin film consisting of Fe as its principal component, which contains at least one kind of element selected from Ta and Hf and at least one kind of element selected from C and N, and wherein the size $d_1$ of the Fe crystal particle and the size $d_2$ of the Ta—C, Ta—N, Hf—C or Hf—N particle have a size ratio $d_1/d_2$ of not greater than 5.

The soft magnetic thin film according to the present invention capable of accomplishing the object described above is a soft magnetic thin film consisting of Fe as its principal component, which contains at least one kind of element selected from Ta and Hf and at least one kind of C and N, and wherein the (110) plane of Fe is preferentially oriented, and the size $d_1$ of the Fe crystal particle and the size $d_2$ of the Ta—C, Ta—N, Hf—C or Hf—N particle have a size ratio $d_1/d_2$ of not greater than 5.

The soft magnetic thin film according to the present invention capable of accomplishing the object described above is a soft magnetic thin film consisting of Fe as its principal component, which contains at least one kind of element selected from Ta and Hf and at least one kind of element selected from C and N, and wherein the (110) plane of Fe is preferentially oriented, the size $d_1$ of the Fe crystal particle is not greater than 15 nm and the size $d_2$ of the Ta—C, Ta—N, Hf—C or Hf—N particle is not greater than 3 nm.

The soft magnetic thin film according to the present invention capable of accomplishing the object described above is a soft magnetic thin film consisting of Fe at its principal component, which contains at least one kind of element selected from Ta and Hf and at least one kind of element selected from C and N, and wherein the (110) plane of Fe is preferentially oriented, the size $d_1$ of the Fe crystal particle is not greater than 15 nm, the size $d_2$ of the Ta—C, Ta—N, Hf—C or Hf—N particle is not greater than 3 nm, and the ratio $d_1/d_2$ is not greater than 5.

Control of the crystal particle sizes of the soft magnetic thin film according to the present invention can be accomplished by first causing the Fe crystal particle to precipitate at the initial stage of film formation and then causing the Ta—C, Ta—N, Hf—C or Hf—N crystal particle to precipitate to control the growth of the crystal particles.

To secure the magnetic characteristics of the magnetic film and its thermal resistance and furthermore, its reliability, the ratio of the size of the Fe crystal particle to the size of the Ta—C, Ta—N, Hf—C or Hf—N crystal particle must be kept at a value below a predetermined value, and the size of each crystal particle must be kept at a value below a predetermined value. Here, the term "size" of the crystal particle is defined as the size of the major side of the crystal particle.

The thin magnetic film described above, particularly a microcrystal precipitation type Fe—N type magnetic thin film, contains Ta or Hf and N and the balance of Fe. More particularly, the magnetic thin film has at least the Fe crystal particle and contains only the compound particle between Ta or Hf and N, or in addition, the Hf or Ta metal, in a polycrystalline structure. Moreover, the composition ratio of the compound particle between Ta or Hf and N is at least 1.2 but not greater than 1.7. Further, the magnetic thin film preferably has the soft magnetic characteristics. Preferably, further, the Hf and N compound particle is at least one kind of the compound selected from $Hf_4N_3$ and $Hf_3N_2$. Needless to say, the compound particle may be a mixture of two kinds of compounds or a non-stoichiometric compound. In the stoichiometric compound described above, $Hf_4N_3$ or $Hf_3N_2$ as the compound particle of Hf and N ordinarily deviates from the stoichiometric composition during its formation, and this deviation is preferably ±10%. In the resulting microcrystal precipitation type Fe type magnetic thin film containing at least Ta or Hf and N and the balance of Fe, the size of the Fe crystal particle is preferably not greater than 15 nm and the size of the compound particle of Ta or Hf and N is preferably not greater than 3 nm from the aspects of the magnetic characteristics and the corrosion resistance. Among the Ta and Hf components in the microcrystal precipitation type Fe type magnetic thin film, metallic Hf or Ta precipitates as the crystalline phase or precipitates in the grain boundary of Fe, or assumes both of these states. From the aspects of the magnetic characteristics and the corrosion resistance, it is preferred that a part of the nitrogen component exists as a solid solution in Fe and more preferably, a part of N as the solid solution in Fe forms a compound with Fe.

Most preferably, the magnetic film has a structure such that the crystal particles of Ta—C, Ta—N, Hf—C or Hf—N are dispersed in the crystal boundary of the Fe crystalline phase. More preferably, a part of at least one kind of element selected from C and N exists as the solid solution in the Fe crystalline phase. When such a condition is satisfied, the crystal particle of Fe can be made finer and the growth of the crystal particle can be restricted. In consequence, the soft magnetic characteristics can be improved and at the same time, the corrosion resistance as well as the heat resistant can be improved. In this case, the lattice plane gap increases, and this represents that a part of at least one kind of element selected from C and N exists as the solid solution in the Fe crystalline phase.

In the soft magnetic thin film described above, the stoichiometric ratio of at least one kind of element selected from Ta and Hf to at least one kind of element selected from N and C, that is, [Hf] (or [Ta])/[N] (or [C]) is most preferably between 0.50 to 1.50. This is the essential composition range from the aspects of the magnetic characteristics and the corrosion resistance. Ion valance can be controlled by controlling the stoichiometric ratio of at least one kind of element selected from Ta and Hf to at least one kind of element selected from N and C in the soft magnetic thin film described above. In other words, the corrosion resistance of the magnetic thin film can be controlled. Control of ion valence leads to control of the stoichiometric ratio of Hf or Ta of the Hf or Ta compound to N or C. Because the kind of the crystal particle to be formed can be thus controlled, the corrosion resistance of the magnetic film can be eventually controlled.

From the aspects of the magnetic characteristics and the corrosion resistance, the microcrystal precipitation type Fe type magnetic thin film preferably has the construction wherein the sum of Hf (or Ta) and N (or C) is within the range of 15 to 25 at % and the ratio of Hf (or Ta) to N or (C), that is, [Hf] (or [Ta])/[N] (or [C]), is within the range of 0.5 to 1.5.

The soft magnetic thin film so produced has the magnetic characteristics, that is, a saturation flux density of at least 1.5T, a coercive force of not greater than 10e and moreover, a permeance at 50 MHz of at least 1,000.

It is most preferred to use the magnetic film described above as a soft magnetic film for a magnetic head. A metal-in-gap type magnetic head is most preferred, in particular, as the magnetic head using the soft magnetic thin film. Furthermore, it is most preferred to record information to a moving information recording medium by using this magnetic head by utilizing the magnetic properties. The information to be recorded is most preferably image information and/or sound information. A medium having a magnetic recording medium layer formed on a tape or a disk is used most preferably as the moving information recording medium.

DESCRIPTION OF THE PREFERRED EMBODIMENTS

The present invention will be explained in detail about the case where a $Fe_{79}Hf_{12}N_9$ alloy film is used as a magnetic film by way of example.

The magnetic film was produced by sputtering. A $Fe_{87}Hf_{13}$ alloy was used as a target, and an $Ar/N_2$ (volume ratio: 92/8) mixed gas was used as the sputtering gas. An RF power density charged was 400 W/150 mm²φ and the sputtering gas pressure was 6 mTorr. However, these conditions are not absolutely limitative but depend on the production apparatus and the production method employed. The thickness of the magnetic film so formed was 5 µm.

The structure of the magnetic film was amorphous X-ray-wise immediately after its production. This magnetic film was annealed at 600° C. for 30 minutes. Annealing was carried out in vacuum or in an inert gas such as Ar, $N_2$, or the like, and a magnetic field of 10 kOe was applied from outside during the thermal treatment.

When the magnetic characteristics of this film were examined, they had excellent values, that is, a saturation flux density Bs of 1.6 T, a permeance µ of 5,000 (5 MHz), a coercive force Hc of 0.10 e, a magnetostriction coefficient λs of $2 \times 10^{-7}$ and a specific resistance ρ of $95 \times 10^{-8}$ Ω·m.

Particularly because the specific resistance was great, an eddy current loss was small, and the magnetic film of this embodiment was suitable for recording and reproduction in a radio frequency range. This magnetic film had a structure such that the main peak existed on the (110) plane of Fe. When the crystal particle size of Fe was determined in accordance with the Scherrer's formula, it was found to be 8 nm. Further, an X-ray diffraction peak resulting from Hf—N could be observed. Since the peak was extremely broad, measurement could not be made more accurately than Fe, but when the crystal particle size was determined from this peak, the size was about 2 nm. When its size ratio to the Fe crystal particle was determined, a Fe/Hf—N ratio was 8/2=4.

Even after this film was dipped into a 0.5N aqueous NaCl solution for 1,000 hours, the rust was not found occurring and deterioration of the magnetic characteristics could not be observed, either. Even when this magnetic film was thermally treated at 700° C., deterioration of the magnetic characteristics and the corrosion resistance could not be observed.

Figure 1:
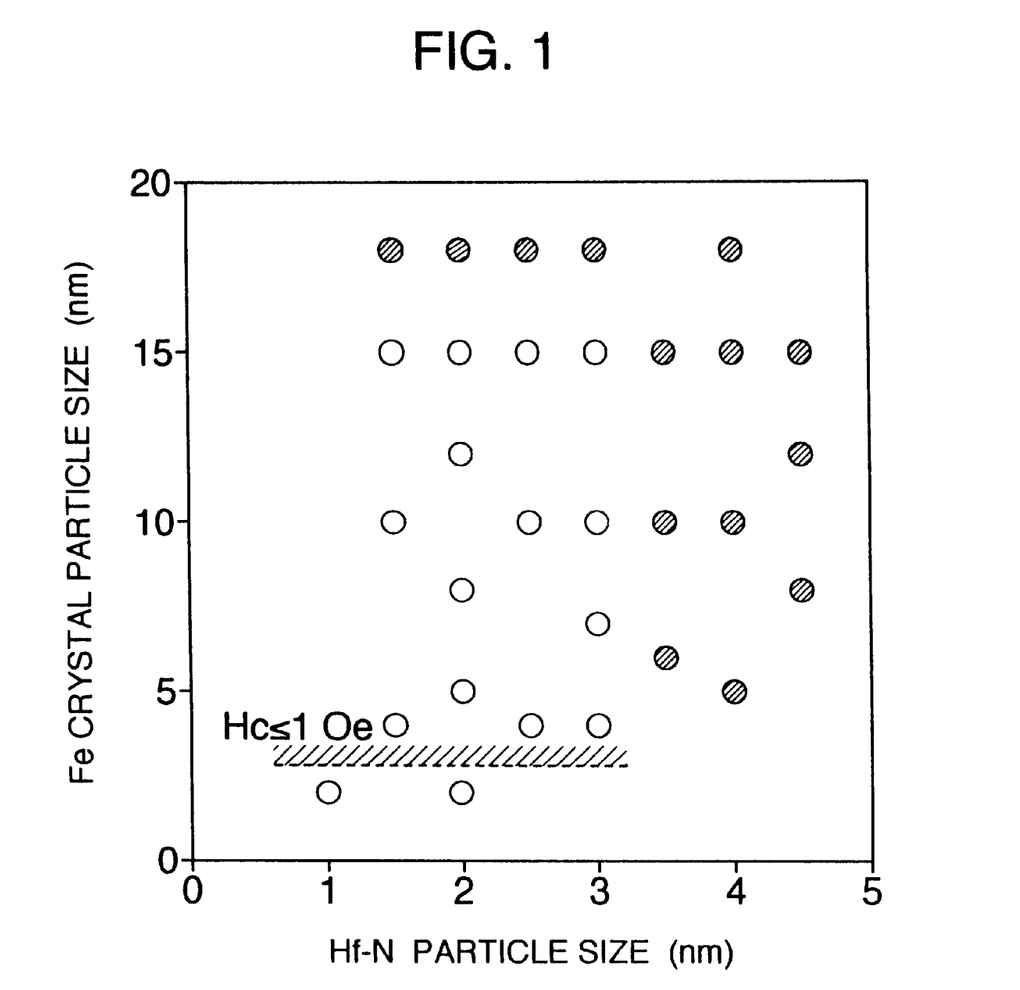
FIG. 1 is a diagram showing the relation between the sizes of Fe crystal particles and Hf—N crystal particles of a Fe type soft magnetic film and its corrosion resistance.

Next, a large number of magnetic films having different Fe crystal particle sizes and different Hf—N crystal particle sizes were produced by variously selecting the sputtering condition and the thermal treatment condition and controlling the Fe and TaC crystal particle sizes in order to examine the relation between the Fe and Hf—N crystal particle sizes and the corrosion resistance. The result is illustrated in FIG. 1. In the drawing, white circle (○) represents those films in which the occurrence of the rust was not observed even after the films were dipped into a 05 N aqueous NaCl solution for 1,000 hours, and black circuit (●) represents those in which the rust occurred, on the contrary. The occurrence of the rust was judged with eye.

It can be understood from FIG. 1 that the corrosion resistance drastically dopped when the Fe crystal particle size exceeded 15 nm or when the Hf—N particle size exceeded 3 nm. When the Fe crystal particle size was smaller than 3 nm, the soft magnetic characteristics, particularly the coercive force, exceeded 10 e, on the contrary. In consequence, the films could not be used as the soft magnetic film. Furthermore, those films in which the Hf—N crystal particle size was about 1 nm and the Fe crystal particle size exceeded 3 nm could not be produced for the reason of the production process. The practical lower limit of the Hf—N crystal particle size was about 2 nm. However, the observation on the TEM level revealed that the films in which the Fe particle size was 2 nm and the Hf—N particle size was 1 nm had a high corrosion resistance but because their coercive force was great, they were not suitable as a magnetic head material.

The stoichiometric ratio of Hf and N was not 1:1 and when the lattice plane gap was estimated from the observation result of the lattice image using the TEM, it was $Hf_4N_3$. Though the ratio Hf/N was 1.3, desired magnetic characteristics and corrosion resistance could be obtained even by changing the stoichiometric ratio if the ratio fell within the range of 0.5 to 1.5. This condition could be accomplished by changing the nitrogen concentration in the sputter gas at the time of the film formation.

The magnetic film having Hf—N dispersed in the Fe phase in this way was normally amorphous immediately after the film formation, and was thermally treated at 500 to 600° C. so as to separate and precipitate the Fe phase and the Hf—N phase. The film was controlled so that the Fe/Hf—N crystal particle size ratio became not greater than 5. To further improve control accuracy, the Fe crystal particles were allowed in advance to precipitate immediately after the film formation and then the film was thermally treated at 500 to 600° C. to precipitate the Hf—N phase. In this way, the growth of the Fe crystal particles could be restricted and at the same time, the growth of the Hf—N particles could be restricted, too, though the working factor dropped to some extents. As a result, the Fe phase and the Hf—N phase could be restricted to maximum 15 nm and maximum 3 nm, respectively, and moreover, this accuracy was resistant to all of the composition change, the change of the sputtering condition and the change of the thermal treatment. Nitrogen added formed a compound with Hf and moreover, formed a penetration type solid solution in the Fe phase, and this, too, contributed to the improvement in the corrosion resistance of the magnetic film.

The effect described above is not peculiar to the Hf—N particle and similar effects can be obtained by dispersing Hf—C, Ta—C or Ta—N besides the Hf—N particles. When carbon is used, carbon forms an intermetallic compound in the Fe phase besides the carbides.

Next, the difference resulting from the difference of the materials of the compounds will be described. When the electrochemical dissolving potential was measured from the aspect of the corrosion resistance, the film had the highest potential, that is, 0.75 V (Ag/AgCl electrode reference, pH=8.3) and the highest corrosion resistance, when the Hf—N particles were dispersed, followed then by the dispersion of Hf—C (0.7 V). Ta—C and Ta—N were the lowest among them (0.6 V), but all the films had a sufficient practical corrosion resistance.

Figure 2:
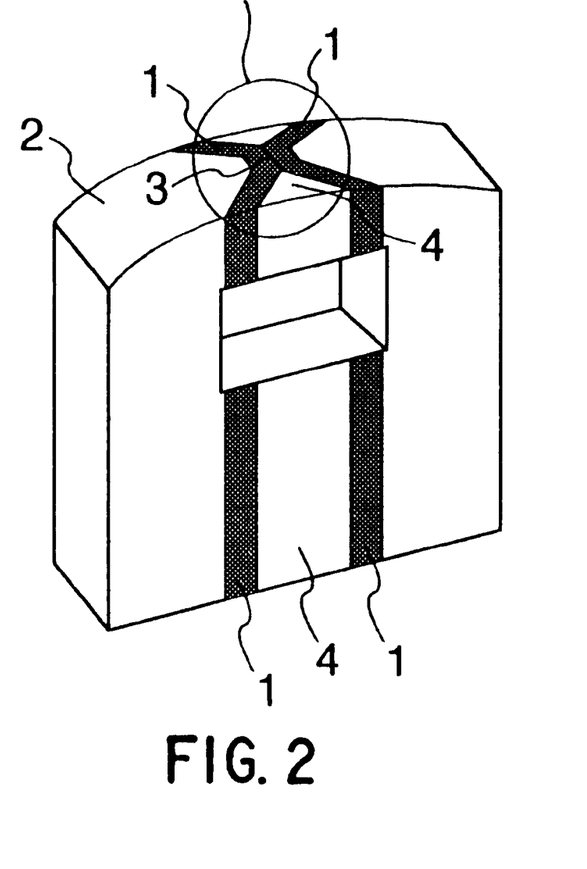
FIG. 2 is a perspective view showing the schematic structure of a magnetic head.
Figure 2A:
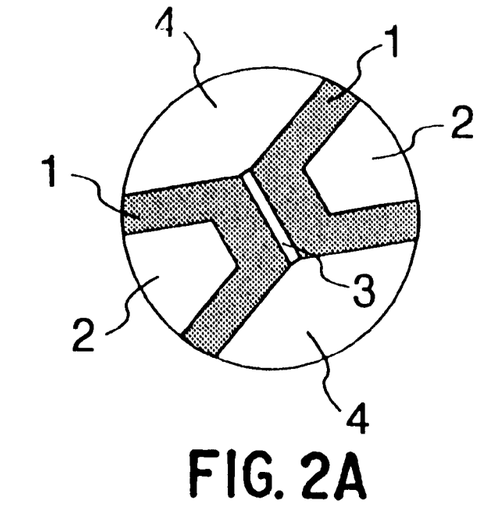

A MIG (Metal-In-Gap) type head was produced by using each of the magnetic films described above. FIG. 2 is a schematic view of a MIG type head so produced. A soft magnetic thin film 1 was formed on a single crystal ferrite substrate 2. The magnetic film used hereby had a composition $Fe_{80}Hf_8N_{12}$. A gap portion 3 was formed by depositing first $SiO_2$ to a thickness of 200 nm on the soft magnetic thin film 1 formed on the ferrite substrate 2 and depositing Cr to a film thickness of 10 nm. It was then thermally treated at 600° C. for 30 minutes in a nitrogen stream and a head substrate having the same shape was bonded by using low melting point glass 4.

A bonding layer for improving adhesion may be sandwiched between the substrate and the magnetic film. This bonding layer may be $SiO_2$, $Si_3N_4$, $Cr_2O_3$, Cr, Fe—Cr, or the like. If this base film is a magnetic film, performance of the magnetic head can be further improved. Film peel did not occur in the magnetic heads so produced.

Figure 3:
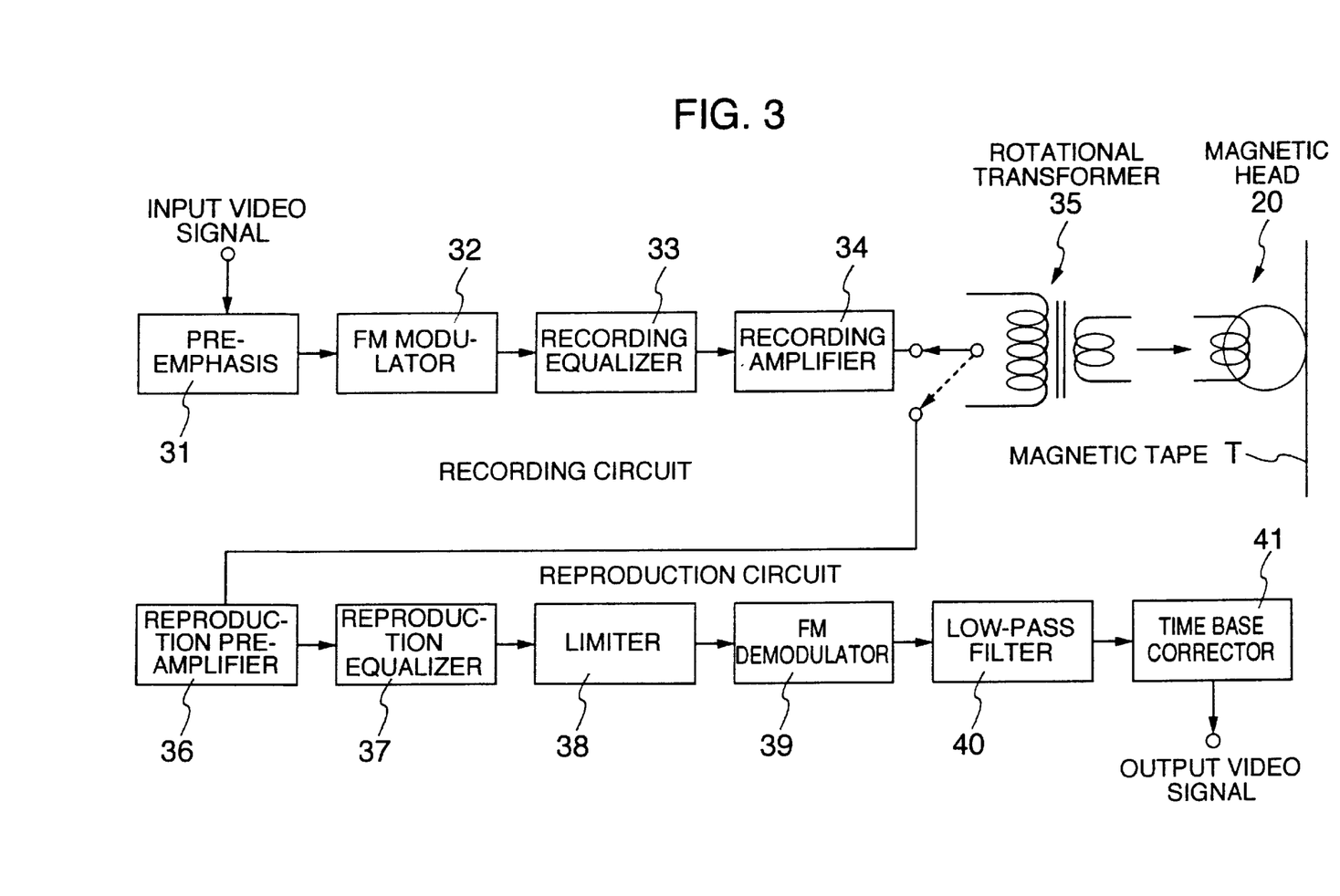
FIG. 3 is a block circuit diagram of a VTR apparatus.

The magnetic head was assembled into a VTR apparatus and a tape was allowed to travel so as to record image information. FIG. 3 is a functional block diagram of the VTR apparatus. The magnetic head 20 shown in FIG. 3 is the MIG type magnetic head shown in FIG. 2. The magnetic head 20 undergoes displacement at the time of recording/reproduction by a magnetic head operation mechanism (not shown) and is brought into contact with a magnetic tape T that travels at a predetermined speed. The magnetic tape T is driven by a magnetic tape driving system not shown.

When recording is made, an input video signal is first sent to a pre-emphasis 31 and then to a rotational transformer 35 through an FM modulator 32, a recording equalizer 33 and a recording amplifier 34. The input video signal is transmitted further from the rotational transformer 35 to a magnetic head 20 and is recorded by the magnetic head 20 to the magnetic tape T which travels while keeping contact with the magnetic head 20.

When reproduction is made, the video signal recording on the magnetic tape T is first read by the magnetic head 20 and is then transmitted to the rotational transformer 35. Further, the video signal is passed through a reproduction pre-amplifier 36, a reproduction equalizer 37, a limiter 38, an FM demodulator 39, a low-pass filter 40 and a time base collector 41 from the rotational transformer 35 and is converted to an output video signal.

When high-definition digital information was recorded by this VTR apparatus, a signal-to-noise ratio (S/N) of at least 40 dB could be obtained. The relative speed between the magnetic head 20 and the magnetic tape T was 36 m/s, the data transfer rate was 46.1 Mbps and a track width was 40 $\mu$m.

Next, the corrosion resistance of this magnetic head was evaluated by a dipping test into a 0.5N aqueous NaCl solution and by a dewing test in a high temperature-high humidity environment (60° C., relative humidity: 95%). First, the MIG type head chip was dipped into a 0.5N aqueous NaCl solution for 500 hours. Next, the recording/reproduction characteristics were measured by setting again this head to the VTR apparatus. As a result, no difference could be observed at all in the recording/reproduction characteristics before and after the dipping test. The evaluation by the high temperature-high humidity environment (60° C., relative humidity: 95%) was carried out by fixing the MIG heat on a Peltier device, keeping the head at 10° C. and leaving the whole assembly standing at 60° C. and R.H. of 95%. As a result, dewing occurred on the head as a whole. Under this state, the head was left standing in this environment for more than 2,000 hours, but the occurrence of the corrosion and deterioration of the recording characteristics and the reproduction signals could not be observed.

Though the present invention has been explained about the magnetic head for the VTR, the magnetic head using the soft magnetic film according to the present invention can be likewise applied to a magnetic tape apparatus, etc, using a magnetic disk and helical scan.

Though the explanation has been given on the Fe—Hf system, by way of example, the effect described herein is not peculiar to the Fe—Hf system and similar effects can be obtained by adding other elements such as La, Ce, Cu, Au, Pb, Ag, Tl, etc, besides Hf. However, from all the aspects of the magnetic characteristics, thermal stability and the corrosion resistance, the greatest effect can be obtained by adding Hf. Moreover, because this element does not undergo solid solution in Fe from the aspect of the constitutional diagram, it provides the greatest effect. The next greatest effect can be obtained by La and Ce, followed then by Cu, Au, Pb, Ag and Tl in order named.

The present invention will be explained in further detail with reference to Embodiment 2 thereof.

A magnetic thin film was produced by sputtering. A composite target obtained by uniformly disposing Hf chips on a Fe disk was used as the target, and an Ar/$N_2$ standard mixed gas (mixing ratio: 92/8) was used as the sputter gas.

A Mn·Zn ferrite substrate was used as a substrate. The crystal orientation was a (332) plane and the substrate position was #4. The substrate was not particularly limited, and the effect of the present invention did not depend on the kind of the substrate. As the sputtering condition, a sputter gas pressure was 6 mTorr and an RF power density charged was 400 W/150 mm$\phi$. The thickness of the magnetic thin film formed was 2 $\mu$m. The magnetic film had a composition $Fe_{77}Hf_9N_{14}$ according to the EDX analysis. After film formation, the magnetic film was thermally treated at 600° C. for 30 minutes. This temperature was decided in accordance with the composition and the structure of the magnetic film. Therefore, it was not absolute and limitative.

When the magnetic characteristics of this magnetic thin film were measured, the film had a saturation flux density of 1.55 T, a coercive force of 0.10, permeance of 7,500 at 1 MHz and 1,800 at 50 MHz, a magnetostriction constant of $4\times10^{-7}$ and a specific resistance of $95.8\times10^{-8}$ $^{(\Omega \cdot m)}$.

Figure 4A:
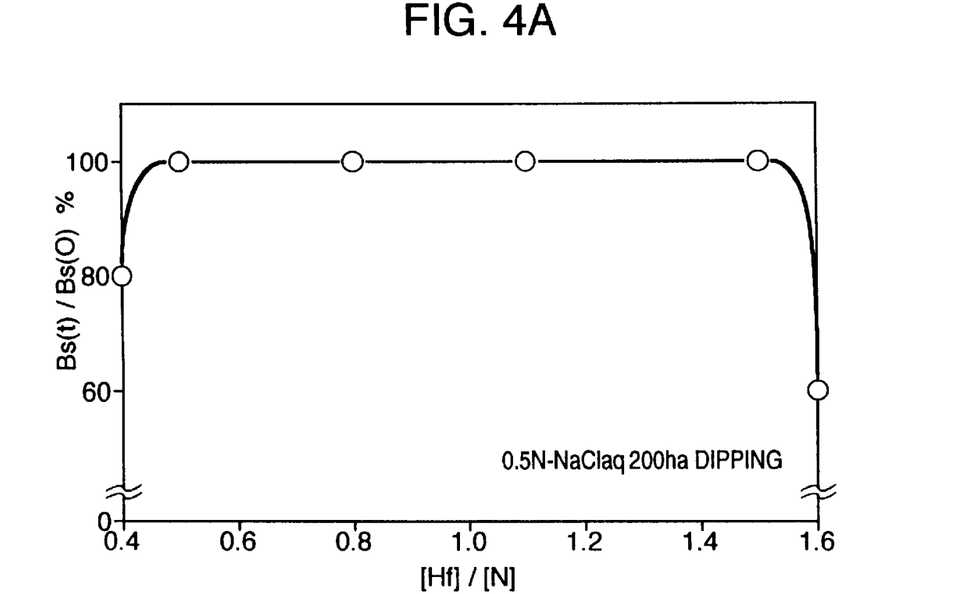
FIGS. 4A and 4B are a diagram showing the relation between the composition of a magnetic film according to the present invention and its corrosion resistance.
Figure 4B:
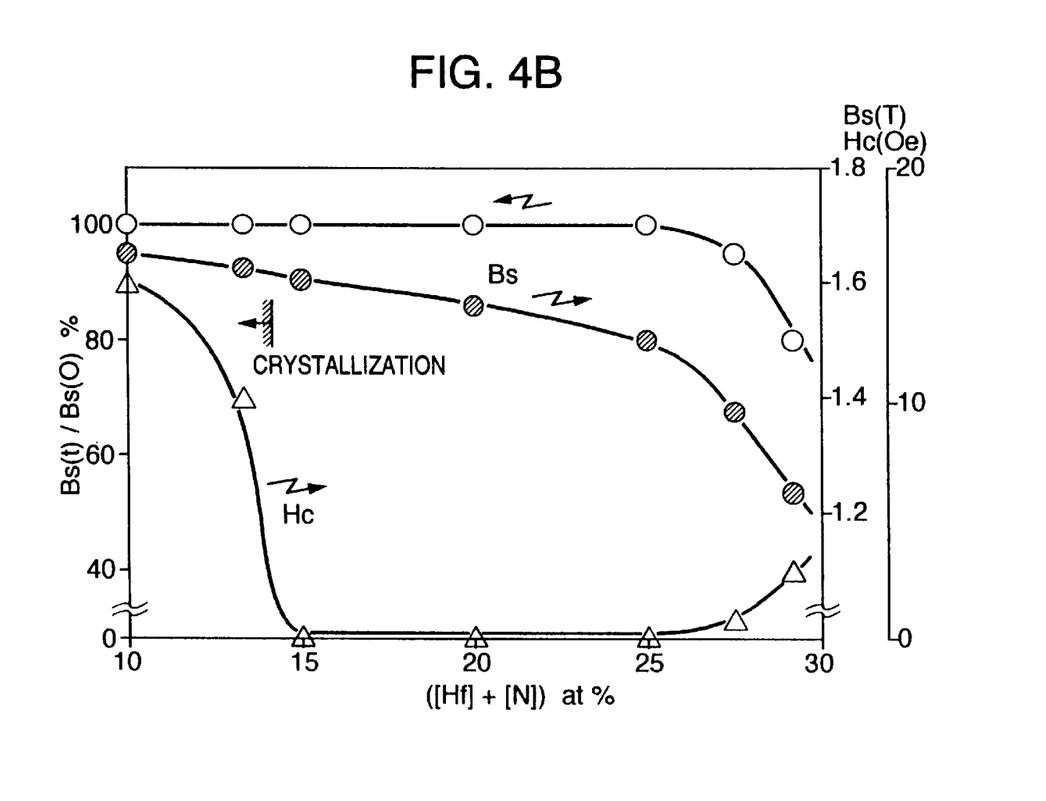

The corrosion resistance of the magnetic thin film was evaluated by the change of the saturation flux density with time when the film was dipped into a 0.5N aqueous NaCl solution. As a result, deterioration of the saturation flux density could not be observed after dipping for 200 hours. For comparison, FIGS. 4A and 4B altogether show the magnetic characteristics and the corrosion resistance of the magnetic thin films when the [Hf]/[N] ratio and the total concentrations of Hf and N in the magnetic film were variously changed. It can be understood from the diagram of FIG. 4A that the corrosion resistance gets deteriorated both when the [Hf]/[N] ratio was greater than 1.5 and when it was smaller than 0.5. As to the relation between the total concentration of Hf and N and the corrosion resistance, the saturation flux density became higher with a lower concentration. When the concentration was less than 15 at %, however, crystallization occurred at the initial stage of film formation, and when the film was thermally treated, the coercive force became higher than 10 Oe, so that the film was not suitable as a magnetic film for a magnetic head. When the total concentration exceeded 25 at %, on the contrary, the saturation flux density became smaller than 1.5T, though the soft magnetic characteristics were not deteriorated. Therefore, the film was not suitable for a magnetic head for high density recording, either. It was found out from the studies described above that the total concentration was at least 15 at % but not greater than 25 at %. The investigation results given above could be summarized as follows. The [Hf]/[N] ratio was preferably $0.5 \leq$ [Hf]/[N]$\leq 1.5$, and the total concentration ([Hf]+[N]) was preferably within the range of $15 \leq ([Hf]+[N]) \leq 25$.

Figure 5:
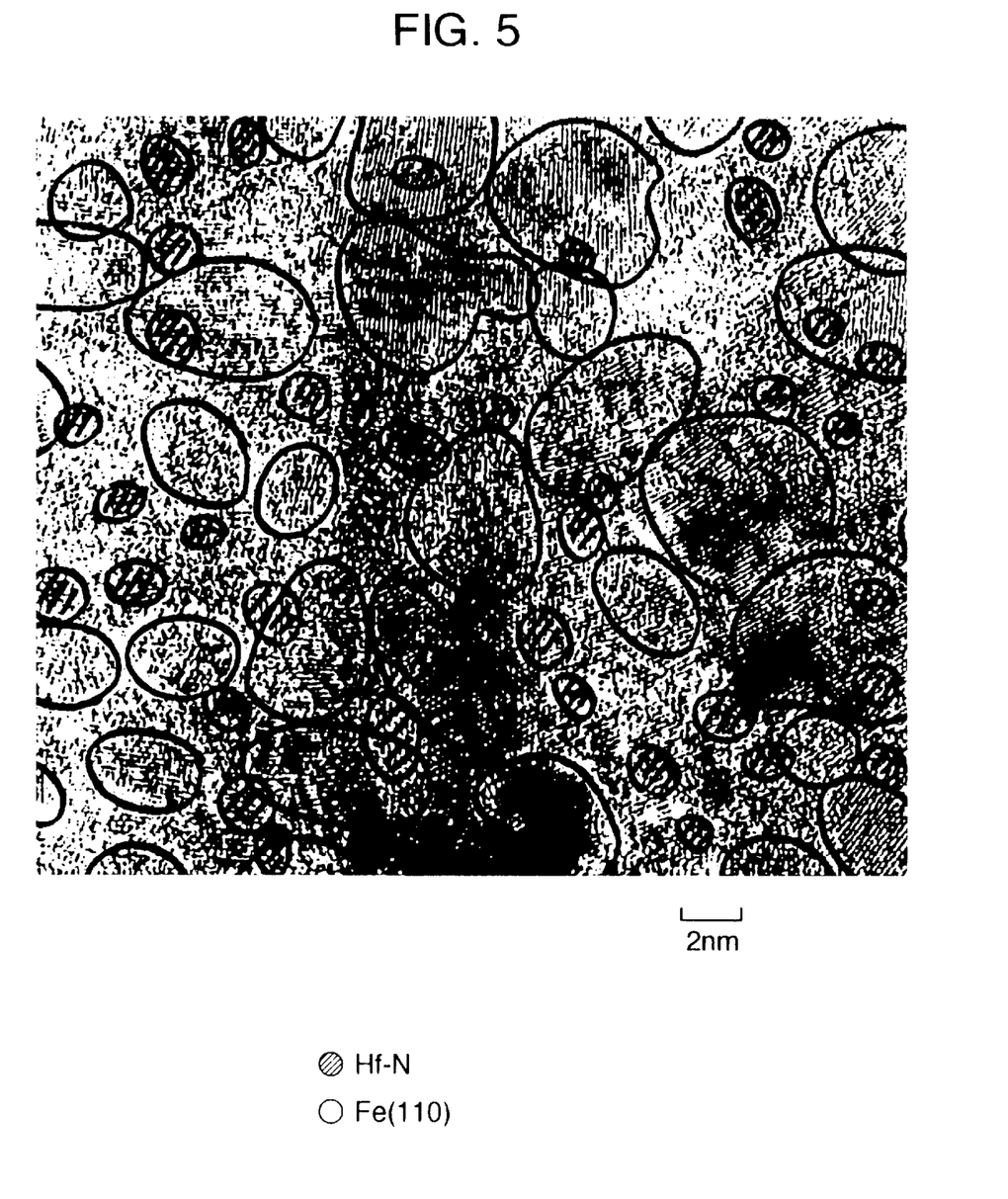
FIG. 5 is a micrograph showing the structure of the magnetic film according to the present invention.

Next, the structure of the $Fe_{77}Hf_9N_{14}$ magnetic thin film having the excellent magnetic characteristics and corrosion resistance was structurally analyzed by a TEM. The result is shown in FIG. 5. The micrograph shows the investigation result when the lattice image was analyzed and its correspondence relation with the crystalline phase was investigated on the basis of the lattice image observation result of $Fe_{77}Hf_9N_{14}$ by utilizing the fact that the lattice image and the electron beam diffraction had the relation of Fourier transform. According to this result, the size of the Fe crystal particles was about 8 nm, its distribution was smaller than that of a Fe—Ta—C film having the same magnetic characteristics, i.e. 8 to 15 nm, and the crystal particle size was smaller, too. The Hf—N crystal particle had a size of 2 nm. Whereas the former Fe—Ta—C film had a TaC particle size of 3 to 5 nm, it could be understood that the Hf—N particles became finer as the system was changed to the Fe—Hf—N system. The Hf—N type compound formed at this time was found to be Hf, $Hf_4N_3$ or $Hf_3N_2$ from the lattice plane gap determined from the result of the electron beam diffraction. As a result of the analysis by the micro-Auger spectroscopy, a part of Hf was found precipitating to the grain boundary of the Fe crystal particles and restricted the growth of the Fe crystal phase. Therefore, the thermal treatment condition after the film formation and the nitrogen concentration at the time of the film formation were changed so as to change the Hf—N particle size and the stoichiometric ratio. According to this experiment, when HfN was formed by changing the stoichiometric ratio of Hf and N but without changing the Hf—N particle size, the magnetic characteristics remained unaltered but as a result of the previous dipping test in the aqueous NaCl solution, the saturation flux density dropped by about 15% from the initial value by dipping for 2,000 hours, and the corrosion resistance got deteriorated. When the nitrogen concentration was lowered to attain Hf-rich state to increase the [Hf]/[N] ratio beyond 1.7, the magnetic characteristics were deteriorated. This was because the crystallization reaction did not sufficiently occur. It could be concluded from this result that the [Hf]/[N] ratio in the Hf—N compound was suitably between 1.2 and 1.7. The crystal particle size of Fe was at least 5 nm and preferably 20 nm from the aspect of the magnetic characteristics and preferably not greater than 15 nm from the aspect of the corrosion resistance. In other words, the suitable Fe crystal size had to be kept within the range of 5 to 15 nm.

A MIG (Metal-In-Gap) type head was then produced by using the magnetic film described above. FIG. 2 shows schematically the structure of this head. First, this soft magnetic thin film 1 was formed on a single crystal ferrite substrate 2. The magnetic film used hereby had a composition $Fe_{80}Hf_8N_{12}$. A gap portion 3 was formed by depositing $SiO_2$ to a thickness of 200 nm on the soft magnetic thin film 1 formed on the ferrite substrate 2 and then depositing Cr to a thickness of 10 nm. The head assembly was thermally treated at 600° C. for 30 minutes in the nitrogen stream, and a head substrate having the same shape was bonded by low melting point glass 4. The thermal treatment temperature is governed by the properties of glass in this glass bonding step such as a glass melting temperature, and is not therefore limited to the treatment temperature described above. Furthermore, a bonding layer may be sandwiched between the substrate and the magnetic film to further improve their adhesion. Performance of the magnetic head can be further improved if this base film is a magnetic film. Peel of the film, etc, did not occur in the magnetic head produced in this way.

A VTR apparatus was produced by using this magnetic head, and a tape was allowed to travel to record image information. When high-definition digital information was recorded, a signal-to-noise ratio (SIN) of at least 40 dB could be obtained. Here, a relative speed was 30 m/s, a data transfer rate was 46.1 Mbps and a track width was 40 μm. The corrosion resistance of this head was evaluated by a dipping test into a 0.5N aqueous NaCl solution and by a dewing test in a high temperature-high humidity environment (60° C., R.H.: 95%). First, the MIG type head chip was dipped into a 0.5N aqueous NaCl solution for 500 hours. Thereafter, the head was again set to the VTR apparatus and the recording/reproduction characteristics were measured. As a result, no difference could be observed in the recording/reproduction characteristics before and after the dipping test. The evaluation test by the dewing test in the high temperature-high humidity environment (60° C., R.H.: 95%) was carried out by first fixing the MIG head to a Peltier device, keeping it at 10° C. and then leaving standing the head as a whole in an environment at 60° C. and a relative humidity of 95%. As a result, dewing occurred on the entire part of the head. The head was further left standing in this environment under this state for more than 2,000 hours, but the occurrence of the corrosion and deterioration of the recording characteristics and the reproduction signals could not be observed.

Though the embodiment has been explained about the magnetic head for the VTR by way of example, the effect of the present invention can be applied to a magnetic tape apparatus, etc, using a magnetic disk and helical scan, but is not governed by the kind of apparatuses, and the like.

FIG. 3 shows an example of the magnetic tape apparatus.

The present invention can obtain a soft magnetic film having a high saturation flux density of at least $Bs \geq 1.5T$, exhibiting excellent soft magnetic characteristics and having moreover high thermal stability and high corrosion resistance. Therefore, the present invention can obtain a magnetic head having high performance and high reliability and a magnetic recording apparatus using the magnetic head. Because a magnetic recording medium having a high coercive force can be sufficiently magnetized in various magnetic recording apparatuses such as a VTR apparatus, a magnetic tape apparatus and a magnetic disk apparatus, high density recording can be accomplished.

What is claimed is:

1. A soft magnetic thin film comprising Fe in the form of crystal particles as its principal component, and containing at least one element selected from Ta and Hf and at least one element selected from C and N, said elements forming Ta—C, Ta—N Hf—C or Hf—N crystal dispersion particles, the size of the Fe crystal particles being not smaller than 3 nm and not greater than 15 nm, the size of the Ta—C, Ta—N, Hf—C or Hf—N crystal dispersion particles being not smaller than 2 nm and not greater than 3 nm, and the ratio of the size of the Fe crystal particles to the size of said dispersion particles being not more than 5.

2. A soft magnetic thin film comprising Fe in the form of crystal particles as its principal component, and containing at least one element selected from Ta and Hf and at least one element selected from C and N, said elements forming Ta—C, Ta—N Hf—C or Hf—N crystal dispersion particles, the (110) plane of said Fe crystal particles being preferentially oriented, the size of the Fe crystal particles being not smaller than 3 nm and not greater than 15 nm, the size of the Ta—C, Ta—N, Hf—C or Hf—N crystal dispersion particles being not smaller than 2 nm and not greater than 3 nm, and the ratio of the size of the Fe crystal particles to the size of said dispersion particles being not more than 5.

3. In a soft magnetic thin film having Fe as its principal component, a microcrystal precipitation type magnetic thin film in which said magnetic thin film comprises at least one element selected from Ta and Hf; and at least one element selected from C and N, said elements forming Ta—C Ta—N Hf—C or Hf—N crystal dispersion particles, and the balance of Fe, having a polycrystalline structure comprising crystal particles of Fe and crystal dispersion particles of Hf—N, Hf—C, Ta—N or Ta—C or Ta or Hf metal, said Ta or Hf and N particles having a composition ratio which is at least 1.2 and not greater than 1.7, or said Ta or Hf and Ca compound particles—having a composition ratio which is at least 0.5 and not greater than 1.5%, the size of the Fe crystal particles being not smaller than 3 nm and not greater than 15 nm, the size of the Ta—C, Ta—N, Hf—C or Hf—N crystal dispersion particles being not smaller than 2 nm and not greater than 3 nm, and the ratio of the size of the Fe crystal particles to the size of said crystal dispersion particles being not more than 5, and said magnetic thin film having soft magnetic characteristics.

4. A microcrystal precipitation soft magnetic thin film according to claim 1, wherein the Hf and N compound particle is at least one kind of compound selected from $Hf_4N_3$ and $Hf_3N_2$.

5. A microcrystal precipitation soft magnetic thin film according to claim 1, wherein $Hf_4N_3$ or $Hf_3N_2$ as said Hf and N compound particle has a deviation of ±10% from a stoichiometric composition.

6. A microcrystal precipitation soft magnetic thin film according to claim 1, wherein said Hf and N compound particle is a Hf and N non-stoichiometric compound.

7. A microcrystal precipitation soft magnetic thin film according to claim 1, wherein said Hf and C compound particle is Ta—C or Hf—C.

8. A microcrystal precipitation soft magnetic thin film according to claim 1, wherein TaC or HfC as said Ta or Hf and C compound particle has a deviation of ±10% from a stoichiometric composition.

9. A microcrystal precipitation soft magnetic thin film according to claim 1, wherein said Ta and N compound particle is Ta—N.

10. A microcrystal precipitation soft magnetic thin film according to claim 1, wherein TaN as said Ta and N compound particle has a deviation of ±10% from a stoichiometric composition.

11. A microcrystal precipitation soft magnetic thin film according to claim 1, wherein at least one kind of crystal particle selected from the group consisting of Ta—C, Ta—N, Hf—C and Hf—N is dispersed in the Fe crystal in the crystal boundary of the Fe crystalline phase.

12. A microcrystal precipitation soft magnetic thin film according to claim 1, wherein the valence of the Ta or Hf ion is controlled by controlling the stoichiometric ratio of at least one kind of element selected from Ta or Hf to at least one kind of element selected from N and C.

13. A microcrystal precipitation soft magnetic thin film according to claim 1, wherein a saturation flux density is at least 1.5T, a coercive force is not greater than 1oe, a magnetostriction constant is not greater than $5 \times 10^{-6}$ and moreover, a permeance is at least 1,000 at 50 MHz.

14. A microcrystal precipitation soft magnetic thin film, comprising Fe in the form of crystal particles and metallic Hf or Ta, said Hf or Ta forming, crystal dispersion particles, said Fe crystal particles precipitated as a crystalline phase among the Ta and Hf components, and/or undergoing solid solution in the Fe crystal particles, the size of the Fe crystal particles being not smaller than 3 nm and not greater than 15 nm, the size of the crystal dispersion particles being not smaller than 2 nm and not greater than 3 nm, and the ratio of the size of the Fe crystal particles to the size of said dispersion particles being not more than 5.

15. A microcrystal precipitation soft magnetic thin film, comprising Fe in the form of crystal particles and C or N forming a penetration solid solution in said Fe, and said N or said C as said solid solution in Fe forming a compound with Fe, the Fe being present in crystal particles not smaller than 3 nm and not greater than 15 nm, and the N or C being present as crystal dispersion particles having a size not smaller than 2 nm and not greater than 3 nm, and the ratio of the size of the Fe crystal particles to the size of said dispersion particles being not more than 5.

16. A microcrystal precipitation soft magnetic thin film, comprising Fe in the form of crystal particles and at least one element selected from Ta and Hf and at least one element selected from C and N, said elements Ta—C, Ta—N Hf—C or Hf—N forming crystal dispersion particles, the size of the Fe crystal particles being not smaller than 3 nm and not greater than 15 nm, the size of the Ta—C, Ta—N, Hf—C or Hf—N crystal dispersion particles being not smaller than 2 nm and not greater than 3 nm, and the ratio of the size of the Fe crystal particles to the size of said dispersion particles being not more than 5, wherein the size of the crystal particle is controlled by causing N or C to undergo solid solution into Fe and/or precipitating Hf or Ta in the crystal boundary for the Fe phase, and by controlling the stoichiometric ratio between Ta or Hf and N or C for a compound phase of Ta or Hf and N or C.

17. A microcrystal precipitation soft magnetic thin film comprising Fe in the form of crystal particles and at least one element selected from Ta and Hf and at least one element selected from C and N, said elements Ta—C, Ta—N Hf—C or Hf—N forming crystal dispersion particles, the size of the Fe crystal particles being not smaller than 3 nm and not greater than 15 nm, the size of the Ta—C, Ta—N, Hf—C or Hf—N crystal dispersion particles being not smaller than 2 nm and not greater than 3 nm, and the ratio of the size of the Fe crystal particles to the size of said dispersion particles being not more than 5, wherein the sum of Ta or Hf and N or C in the composition of said magnetic thin film is within the range of 15 to 25 at %.

18. A magnetic head using a microcrystal precipitation soft magnetic thin film comprising Fe as its principal component, characterized in that it contains at least one kind of element selected from Ta and Hf and at least one kind of element selected from C and N, and a ratio $d_1/d_2$ of the size $d_1$ of the crystal particle of Fe to the size $d_2$ of Ta—C, Ta—N, Hf—C or Hf—N particle is not greater than 5.

19. A magnetic head using a microcrystal precipitation soft magnetic thin film comprising Fe as its principal component, characterized in that it contains at least one kind of element selected from Ta and Hf and at least one kind of element selected from C and N, the (110) plane of Fe is preferentially oriented, the size $d_1$ of the crystal particle of Fe is not greater than 15 nm, and the size $d_2$ of Ta—C, Ta—N, Hf—C or Hf—N particle is not greater 3 nm.

20. A magnetic head using a microcrystal precipitation soft magnetic thin film, and said magnetic head being a metal-in-gap head, said soft magnetic thin film comprising Fe as its principal component, characterized in that it contains at least one kind of element selected from Ta and Hf and at least one kind of element selected from C and N, and a ratio $d_1/d_2$ of the size $d_1$ of the crystal particle of Fe to the size $d_2$ of Ta—C, Ta—N, Hf—C or Hf—N particle is not greater than 5.

21. A magnetic head using said microcrystal precipitation soft magnetic thin film, and said magnetic head being a metal-in-gap head, said soft magnetic thin film comprising Fe as its principal component, characterized in that it contains at least one kind of element selected from Ta and Hf and at least one kind of element selected from C and N, the (110) plane of Fe is preferentially oriented, the size $d_1$ of the crystal particle of Fe is not greater than 15 nm, and the size $d_2$ of Ta—C, Ta—N, Hf—C or Hf—N particle is not greater 3 nm.

22. A magnetic recording apparatus in which information is recorded by utilizing magnetic properties on a moving information recording medium by using a magnetic head using a microcrystal precipitation soft magnetic thin film comprising Fe as its principal component, characterized in that it contains at least one kind of element selected from Ta and Hf and at least one kind of element selected from C and N, and a ratio $d_1/d_2$ of the size $d_1$ of the crystal particle of Fe to the size $d_2$ of Ta—C, Ta—N, Hf—C or Hf—N particle is not greater than 5.

23. A magnetic recording apparatus in which information is recorded by utilizing magnetic properties on a moving information recording medium by using a magnetic head using a microcrystal precipitation soft magnetic thin film comprising Fe as its principal component, characterized in that it contains at least one kind of element selected from Ta and Hf and at least one kind of element selected from C and N, the (110) plane of Fe is preferentially oriented, the size $d_1$ of the crystal particle of Fe is not greater than 15 nm, and the size $d_2$ of Ta—C, Ta—N, Hf—C or Hf—N particle is not greater 3 nm.

* * * * *

UNITED STATES PATENT AND TRADEMARK OFFICE
CERTIFICATE OF CORRECTION

PATENT NO. : 5,962,153
DATED : October 5, 1999
INVENTOR(S) : Fumiyoshi Kirino, et al.

It is certified that error appears in the above-identified patent and that said Letters Patent is hereby corrected as shown below:

| Column | Line | |
|---|---|---|
| 1 | 45 | Change "must has" to --must have--. |
| 2 | 51 | Change "at its" to --as its--. |
| 3 | 25 | Delete "type Fe type". |
| 3 | 32 | Delete "type Fe type". |
| 4 | 5 | Delete "type Fe". |
| 4 | 6 | Delete "type". |
| 3 | 49 | Change "resistant" to --resistance--. |
| 5 | 32 | Change "black circuit (●)" to --black circle (●)--. |
| 5 | 36 | Change "dopped" to --dropped--. |
| 9 | 42 | Change "(SIN)" to --(S/N)--. |
| 10 | 21 | After "Ta-N" insert --,--. |

UNITED STATES PATENT AND TRADEMARK OFFICE
CERTIFICATE OF CORRECTION

PATENT NO. : 5,962,153
DATED : October 5, 1999
INVENTOR(S) : Fumiyoshi Kirino, et al.

It is certified that error appears in the above-identified patent and that said Letters Patent is hereby corrected as shown below:

| Column | Line | |
|--------|------|---|
| 10 | 32 | After "Ta-N" insert --,--. |
| 10 | 44 | After "Ta-C" insert --,--. |
| 11 | 54 | After "Ta-N" insert --,--. |
| 12 | 2 | After "Ta-N" insert --,--. |
| 12 | 26 | After "greater" insert --than--. |
| 12 | 44 | After "greater" insert --than--. |

Signed and Sealed this

Eighth Day of May, 2001

NICHOLAS P. GODICI

*Attest:*

*Attesting Officer*    Acting Director of the United States Patent and Trademark Office